(12) United States Patent
Stork

(10) Patent No.: US 8,554,771 B2
(45) Date of Patent: Oct. 8, 2013

(54) TECHNIQUE FOR FAST AND EFFICIENT HIERARCHICAL CLUSTERING

(75) Inventor: Christopher Stork, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 322 days.

(21) Appl. No.: 12/636,898

(22) Filed: Dec. 14, 2009

(65) Prior Publication Data

US 2011/0145238 A1    Jun. 16, 2011

(51) Int. Cl.
*G06F 7/00* (2006.01)
*G06F 17/30* (2006.01)

(52) U.S. Cl.
USPC .......................................................... 707/737

(58) Field of Classification Search
USPC .......................................................... 707/737
See application file for complete search history.

(56) References Cited

U.S. PATENT DOCUMENTS

| | | | | |
|---|---|---|---|---|
| 2005/0271297 | A1* | 12/2005 | Zbilut et al. | 382/278 |
| 2007/0122041 | A1* | 5/2007 | Moghaddam et al. | 382/224 |
| 2007/0271265 | A1* | 11/2007 | Acharya et al. | 707/6 |

OTHER PUBLICATIONS

"Fast Hierarchical Clustering and Other Applications of Dynamic Closest Pairs" by David Eppstein, 1998 Proceedings of the ninth annual ACM-SIAM symposium on Discrete algorithms, pp. 619-628, http://dl.acm.org/citation.cfm?id=315030.*

Baek, Seongjoon et al., "A Fast Encoding Algoritm for Vector Quantization", IEEE Signal Processing Letters, Dec. 1997, vol. 4, No. 12, pp. 325-327.

Anderberg, Michael R., "Cluster Analysis for Applications", 1973, pp. 145-146, Academic Press, Inc., New York, New York.

Day, William H. E. et al., "Efficient Algorithms for Agglomerative Hierarchical Clustering Methods", Journal of Classification, 1984, vol, 1, No. 1, pp. 7-24.

Cluster analysis, Wikipedia, retrieved from Internet on Nov. 20, 2009, <http://en.wikipedia.org/wiki/Cluster_analysis>, 13 pages.

Principal component analysis, Wikipedia, retrieved from Internet on Nov. 20, 2009, <http://en.wikipedia.org/wiki/Principal_component_analysis>, 13 pages.

Hyperspectral imaging, Wikipedia, retrieved from Internet on Nov. 20, 2009, <http://en.wikipedia.org/wiki/Hyperspectral_imaging>, 5 pages.

* cited by examiner

*Primary Examiner* — Jacob F Bétit
*Assistant Examiner* — Christy Lin
(74) *Attorney, Agent, or Firm* — Blakely Sokoloff Taylor & Zafman LLP

(57) ABSTRACT

A fast and efficient technique for hierarchical clustering of samples in a dataset includes compressing the dataset to reduce a number of variables within each of the samples of the dataset. A nearest neighbor matrix is generated to identify nearest neighbor pairs between the samples based on differences between the variables of the samples. The samples are arranged into a hierarchy that groups the samples based on the nearest neighbor matrix. The hierarchy is rendered to a display to graphically illustrate similarities or differences between the samples.

22 Claims, 6 Drawing Sheets

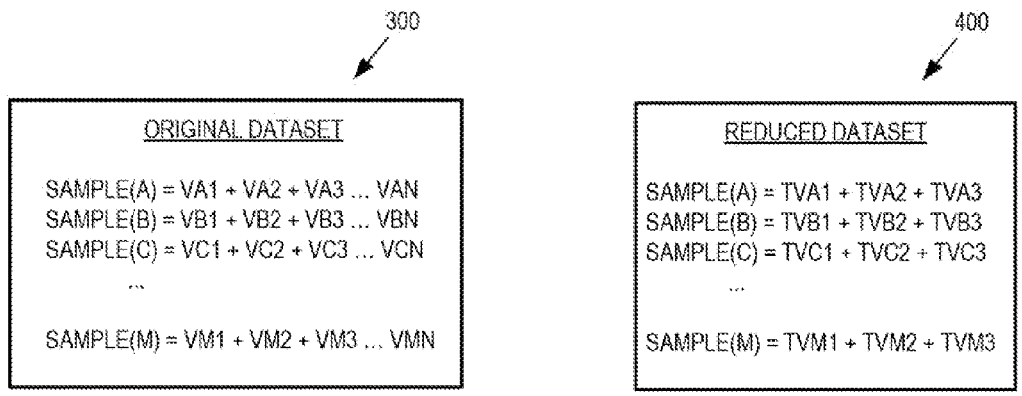

TECHNIQUE FOR FAST AND EFFICIENT HIERARCHICAL CLUSTERING

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to data analysis, and in particular but not exclusively, relates to hierarchical clustering for analyzing large data sets.

BACKGROUND INFORMATION

Hierarchical clustering is an important tool for understanding the relationships (e.g., similarities and differences) between samples in a dataset, and is routinely used in the analysis of relatively small datasets (e.g., when the number of samples is less than 200). Hierarchical clustering organizes a set of samples into a hierarchy of clusters, based on the distances of the clusters from one another in the variable or measurement space. This hierarchy is represented in the form of a tree or dendrogram. FIG. 1A illustrates a dataset 100 composed of six samples A-F where each sample is characterized by two variables or dimensions X and Y. The samples A-F have been plotted in the two-dimensional variable space 105. In other words, the plotted position of each sample A-F within space 105 is representative of that sample's measured values for the variables X and Y. FIG. 1B illustrates a dendrogram 110 with the individual samples A-F at one end, such that each sample forms its own cluster (LEVEL 0), and a single cluster C5 containing every sample at the other end (LEVEL 5). Each successive level of dendrogram 110 illustrates the relative proximity of clusters formed from samples A-F within space 105 using Euclidian distance as measured using the vector space X and Y. At LEVEL 0 each sample forms its own cluster, at LEVEL 1 the two closest samples are clustered together (i.e., samples B and C in cluster C1). Dendrogram 110 continues until all samples A-F are grouped into the single cluster C5.

Hierarchical clustering, however, is typically not applied to hyperspectral images or other large datasets due to computational and computer storage limitations. Hyperspectral image sets are characterized by a large number of samples or pixels (for example, typically greater than 10,000) and a large number of variables or spectral channels (for example greater than 100). Conventional hierarchical clustering techniques require the calculation and updating of a pair wise cluster dissimilarity matrix. The cluster dissimilarity matrix stores the distance between each pair of clusters comprising a data set, and can be used to facilitate hierarchical clustering. A problem arises, however, in calculating and storing this cluster dissimilarity matrix for large datasets. As a case in point, for a hyperspectral image set composed of 10,000 pixels, the corresponding cluster dissimilarity matrix would initially be of dimensions 10,000 by 10,000, resulting in out-of-memory errors on a standard desktop computer. For datasets where the number of samples ranges from approximately 2,000 to 8,000, conventional hierarchical clustering techniques require anywhere from several hours to days to complete due to the high computational overhead in calculating and updating the cluster dissimilarity matrix.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3 illustrates an unreduced original dataset, in accordance with an embodiment of the invention.

FIG. 4 illustrates a reduced dataset, in accordance with an embodiment of the invention.

FIG. 5 illustrates a nearest neighbor matrix, in accordance with an embodiment of the invention.

DETAILED DESCRIPTION

Embodiments of a system and method for a fast and efficient hierarchical clustering technique are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The fast and efficient hierarchical clustering ("FEHC") technique described herein can potentially reduce computational time for large datasets from days to minutes. For example, FEHC can be applied to very large hyperspectral image sets (e.g., greater than 10,000 pixels with each pixel having greater than 100 spectral channels). In contrast to conventional hierarchical clustering algorithms, embodiments of FEHC need not calculate the cluster dissimilarliy matrix, but rather, uses a nearest neighbor matrix, which for a given cluster, identifies that cluster's nearest neighbor and its nearest neighbor proximity (e.g., see FIG. 5). The nearest neighbor matrix is updated as the FEHC technique proceeds through multiple iterations. The memory and time consumed to generate a nearest neighbor matrix is significantly reduced when compared to generating the cluster dissimilarity matrix.

Figure 2:
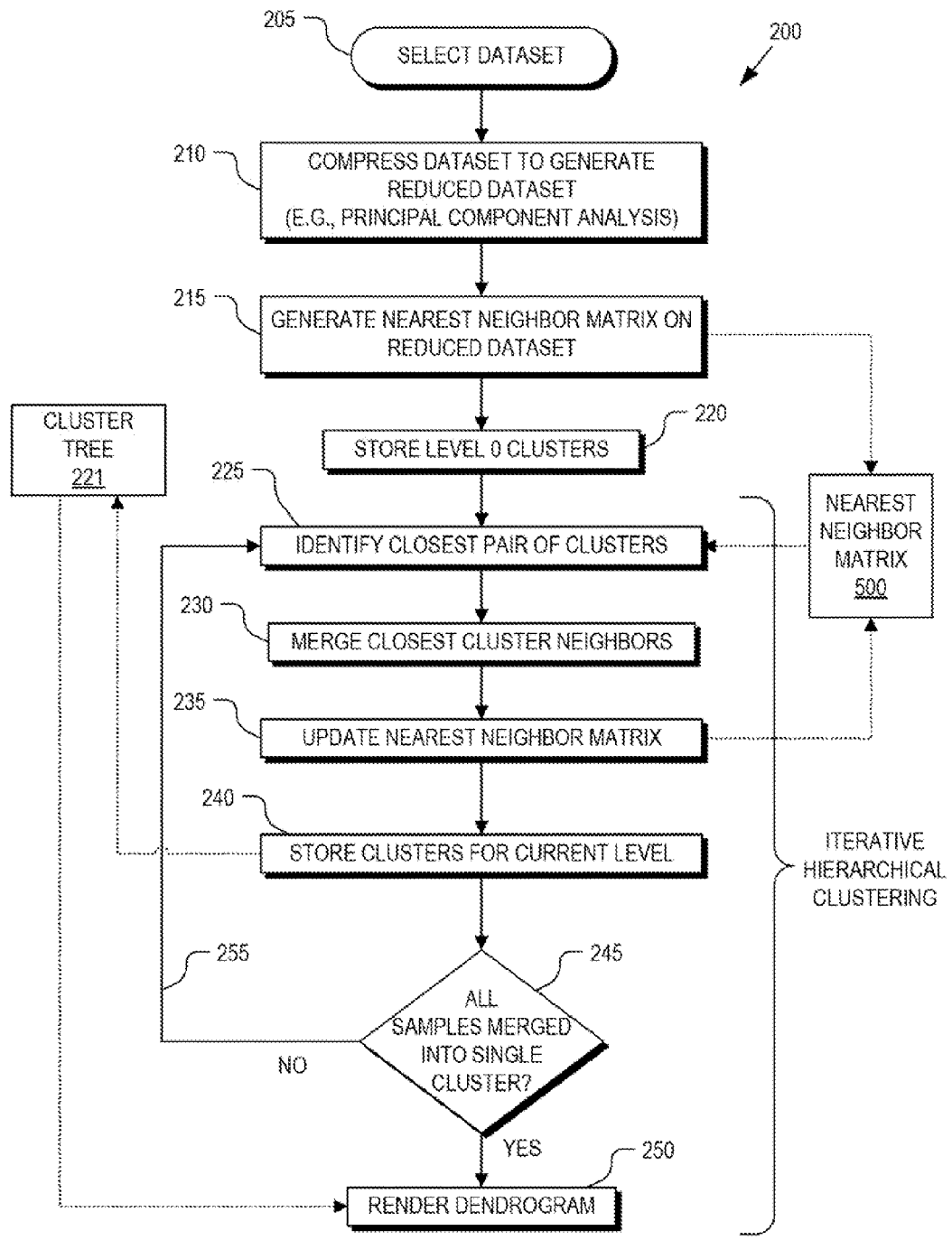
FIG. 2 is a flow chart illustrating a process for fast and efficient hierarchical clustering, in accordance with an embodiment of the invention.

FIG. 2 is a flow chart illustrating a process 200 for implementing the FEHC technique, in accordance with an embodiment of the invention. Process 200 is described with reference to FIGS. 3-5. The order in which some or all of the process blocks appear in process 200 should not be deemed limiting. Rather, one of ordinary skill in the art having the benefit of the present disclosure will understand that some of the process blocks may be executed in a variety of orders not illustrated. APPENDIX A includes MATLAB computer code for implementing an embodiment of the FEHC technique.

In a process block 205, a dataset of samples is selected. The dataset may be large or small; however FEHC is particularly well suited for handling large datasets. For example, datasets extracted from hyperspectral images including greater than 10,000 pixels with each pixel having greater than 100 spectral channels may be organized using embodiments of the FEHC technique in a reasonable period of time (e.g., a few minutes) without consuming an unreasonable amount of memory (e.g., consuming less than the amount of memory available on a typical desktop computer). Of course, small datasets extracted from alternative sources may be analyzed using FEHC. FEHC is applicable to analyze datasets originating from a wide variety of human endeavors including: economics, medicine, agriculture, pharmaceuticals and drug discovery, data mining, information discovery, homeland security, or otherwise.

Once selected, the original dataset is preprocessed or compressed to generate a reduced dataset (process block 210). FIG. 3 illustrates an original (uncompressed) dataset 300. As illustrated, original dataset 300 includes samples A-M (where M may represent an arbitrary number). Each sample is represented by variables 1 to N (where N may represent an arbitrary number). Each sample may be thought of as a vector having N variables. For example, SAMPLE(A) represents the vector in variable space formed by variables VA1, VA2, VA3, ... VAN. In the use case scenario of hyperspectral imaging, each sample may correspond to a pixel within a hyperspectral image, while each variable of the sample vector corresponds to an attenuation, reflectance, radiance, or intensity value (or some other measureable quantity) of a particular spectral channel or band. FIG. 4 illustrates a reduced (compressed) dataset 400. In the illustrated embodiment, reduced dataset 400 includes the same number of samples, but each sample is represented by a vector of transformation variables, where the number of transformation variables in each vector of reduced dataset 400 is fewer than the number of variables in each vector of original dataset 300.

In one embodiment, principal component analysis is applied to original dataset 300 to obtain reduced dataset 400. Principal component analysis is a mathematical procedure that transforms a set of potentially correlated original variables into a smaller number of uncorrelated variables. In the illustrated embodiment, principal component analysis reduced the variables VA1, VA2, VA3 ... VAN of SAMPLE (A) within original dataset 300 to three transformation variables TVA1, TVA2, and TVA3 within SAMPLE(A) of reduced dataset 400. In one embodiment, each transformation variable of a given reduced vector represents a linear combination of multiple variables of the corresponding original vector. It is noteworthy that principal component analysis often produces the advantageous side benefit of noise filtering the original dataset 300.

In a process block 215, a nearest neighbor matrix 500 (e.g., see FIG. 5) is generated based on reduced dataset 400. Nearest neighbor matrix 500 identifies nearest neighbor pairs between the samples of the dataset. The illustrated embodiment of nearest neighbor matrix 500 includes a nearest neighbor column 505, a proximity column 510, and a given sample column 515.

Figure 1A:
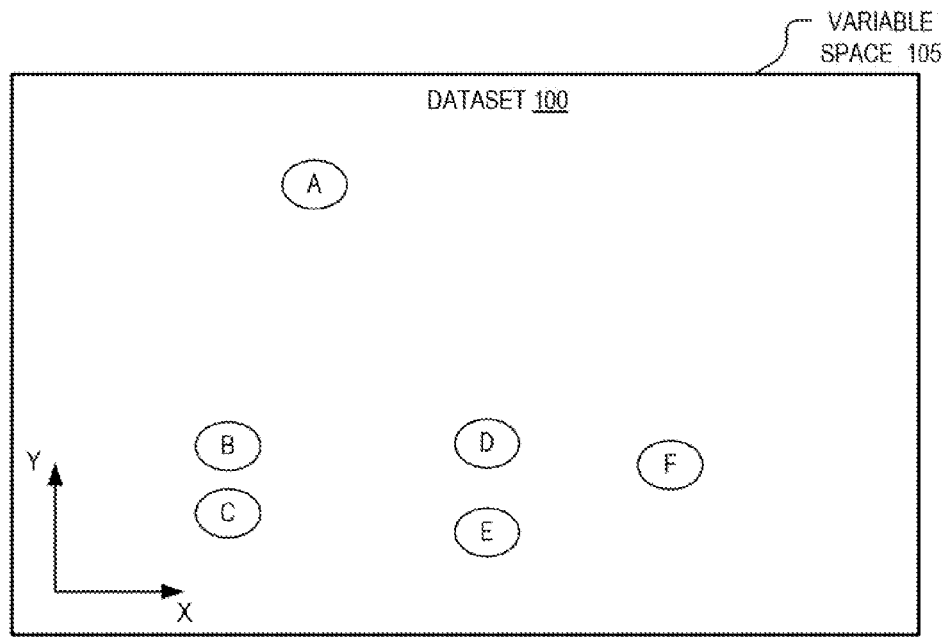
FIG. 1A (PRIOR ART) is a block diagram illustrating a six sample dataset composed of two measured variables.

In the illustrated embodiment of nearest neighbor matrix 500, column 505 identifies the closest sample neighbor to the given sample on the same row in column 515. Proximity column 510 identifies the "proximity" or "distance" between the paired samples. The proximity values within column 510 are generated based on a proximity measurement technique described in greater detail below in connection with FIG. 6. However, at an abstract level, the proximity values represent a distance measurement between the paired samples as measured in the variable space of the transformation vectors. For example, referring to dataset 100 illustrated in FIG. 1A, the proximity values would represent an approximation of the two dimensional distance within variable space 105 between paired samples. It is noteworthy that FIG. 5 illustrates nearest neighbor matrix 500 based on the example dataset 100 illustrated in FIG. 1A merely for purposes of explanation; however, nearest neighbor matrix 500 is intended to represent the broader concept of the nearest neighbor matrix as described herein.

In a process block 220, prior to the first iteration of FEHC, each individual sample of the dataset is identified as its own cluster and a representation of the cluster is stored to LEVEL 0 within cluster tree 221. Cluster tree 221 is the data structure used to store the dendrogram hierarchy as it is iteratively generated. In one embodiment, the cluster tree stores the indices of the closest pair of clusters and the distance between the closest pair of clusters at each level of the hierarchical clustering algorithm. Process 200 is presented in the context of agglomerative hierarchical clustering; however, one of ordinary skill in the art having the benefit of the instant disclosure may appreciate that with appropriate alterations FEHC may be tailored for divisive hierarchical clustering.

Next, process 200 enters the iterative portion of FEHC. In a process block 225, proximity column 510 within nearest neighbor matrix 500 is inspected to identify the nearest neighbor pair having the closest proximity (e.g., smallest proximity value). In a process block 230, the cluster pair identified as being nearest or closest is merged into a single cluster. One embodiment of merging two clusters into a single merged cluster is described in greater detail below in connection with FIG. 7. In a process block 235, nearest neighbor matrix 500 is updated to reflect the merging of the closest cluster neighbors. In one embodiment, memory is recycled during the merging by releasing entries associated with the merging clusters and reallocating at least a portion of that released memory to the merged cluster. In a process block 240, after merging a cluster pair, a representation of the merged pair is stored into cluster tree 221 at the next level, which in this case would be LEVEL 1.

Figure 1B:
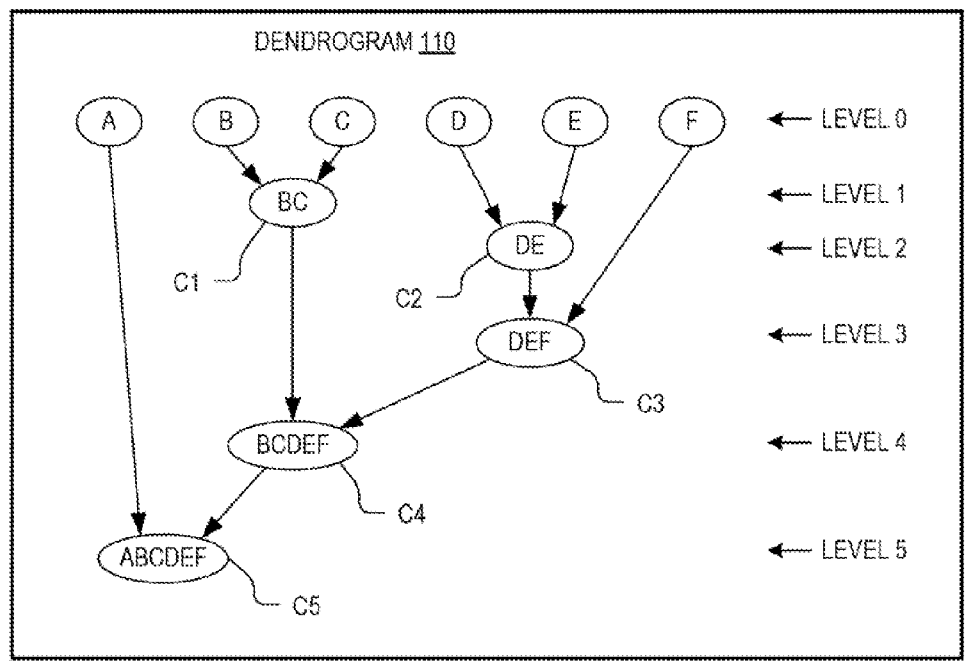
FIG. 1B (PRIOR ART) illustrates a hierarchical clustering dendrogram generated for the dataset of FIG. 1A.

FEHC is iterated by repeating process blocks 225 through 240 until all samples have been merged into a single cluster (e.g., duster C5 in the example of FIG. 1B.) In one embodiment, once all samples have been merged into a single cluster (decision block 245), then a dendrogram based on the cluster tree 221 can be rendered to a display screen (process block 250). In an alternative embodiment, each level of the dendrogram may be rendered once the closest cluster neighbors for that level have been identified. In this alternative embodiment, the dendrogram would be rendered one level at a time upon each iteration through loop 255 in process 200.

Figure 6:
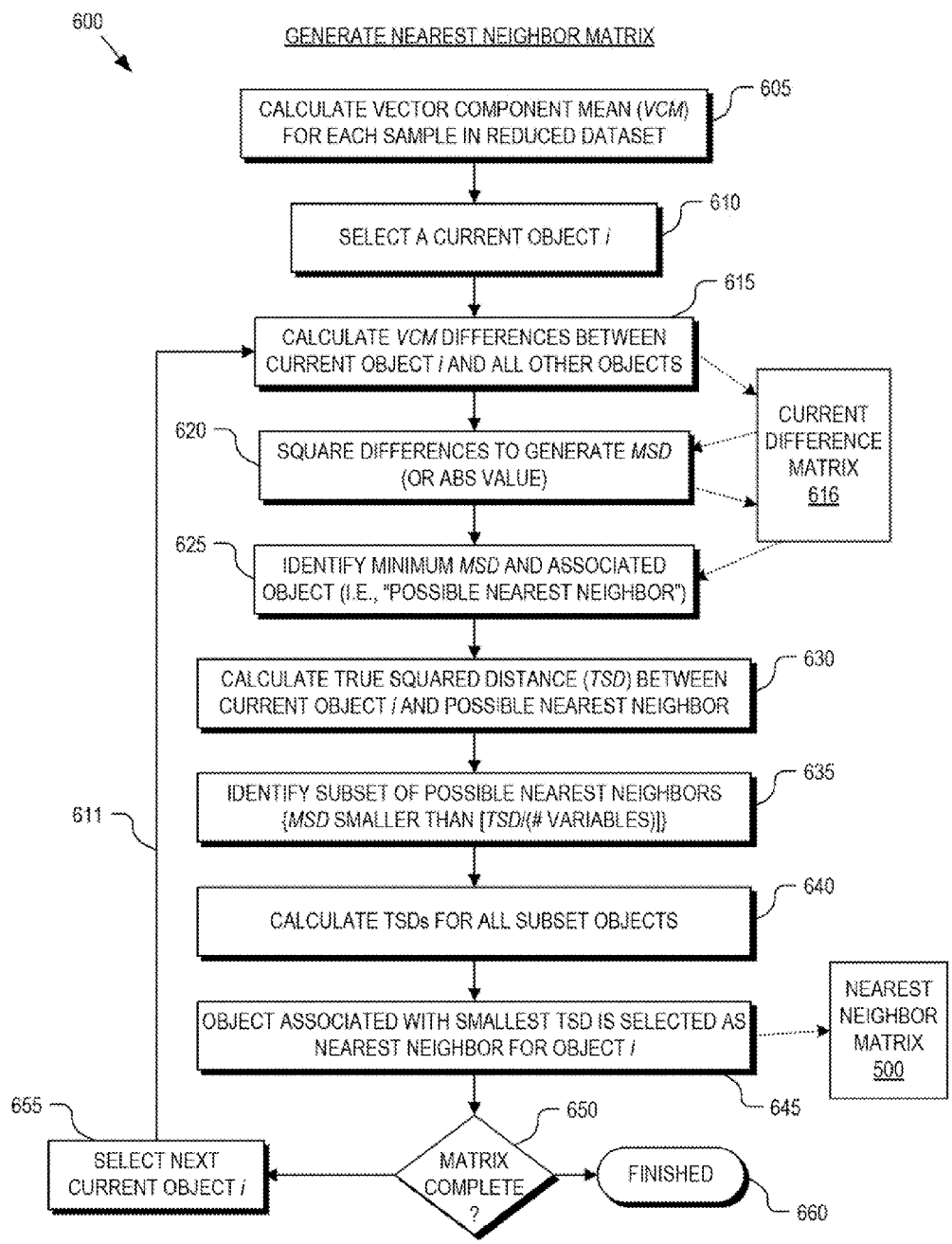
FIG. 6 is a flow chart illustrating a process for generating the nearest neighbor matrix using a reduced nearest neighbor search, in accordance with an embodiment of the invention.

FIG. 6 is a flow chart illustrating a process 600 for generating the nearest neighbor matrix using a reduced nearest neighbor search, in accordance with an embodiment of the invention. Process 600 represents greater detail for performing one embodiment of process block 215 in FIG. 2, and thus, in one embodiment may be viewed as an extension of process 200. The order in which some or all of the process blocks appear in process 600 should not be deemed limiting. Rather, one of ordinary skill in the art having the benefit of the present disclosure will understand that some of the process blocks may be executed in a variety of orders not illustrated.

In a process block 605, a vector component mean ("VCM") is calculated for each sample within reduced dataset 400. For example, the VCM of SAMPLE(A) illustrated in FIG. 4 may be calculated as: VCM(A)=(TVA1+TVA2+TVA3)/3. The VCM is a mean or average of the components or transformation variables of a given vector within reduced dataset 400.

In a process block 610, a current object i is selected prior to entering iteration loop 611. An "object" represents a cluster, which may include only a single sample (e.g., LEVEL 0 of dendrogram 110) or multiple merged samples (e.g., LEVELS 1-5 of dendrogram 110). When generating the initial nearest neighbor matrix 500 prior to merging any of the clusters, all objects will correspond to a single sample for agglomerative clustering; however, if process 600 (or part thereof) is used to update nearest neighbor matrix 500, then objects can correspond to merged clusters.

In a process block 615, VCM differences are calculated between the current object i and all other objects. For example, if the current object is SAMPLE(A), then VCM(A) may be subtracted from each of the other VCMs (e.g., VCM (B)−VCM(A), VCM(C)−VCM(A), VCM(D)−VCM(A), etc.). The results of the calculated VCM differences are stored into a current difference matrix 616.

In a process block 620, the VCM differences are squared to generate mean squared differences ("MSDs"). In one embodiment, current difference matrix 616 is updated to reflect the MSD values. Squaring the VCM differences eliminates negative values. Accordingly, in other embodiments other mathematical functions may be applied to eliminate negative values, such as taking the absolute value as opposed to the square.

In a process block 625, current difference matrix 616 is inspected to identify the minimum MSD value (or minimum ABS {VCM difference}). The object associated with the minimum MSD value is also identified in process block 625. The associated object is referred to as the "possible nearest neighbor" to object i. However, this is only a preliminary determination and the possible nearest neighbor may not end up being the actual nearest neighbor subsequently identified in a process block 645.

In a process block 630, a "true" squared distance ("TSD") based on the transformation vectors for the current object i and the possible nearest neighbor is calculated. This TSD value may be calculated using a variety of proximity measures, such as the Euclidean Distance measure, the Manhattan Distance measure, a Correlation Distance measure, or otherwise. For example, if a Euclidean Distance measure is used, the TSD between object i and SAMPLE(B) (or object B) would equal $(TVi1-TVB1)^2+(TVi2-TVB2)^2+(TVi3-TVB3)^2$.

In a process block 635, a subset of possible nearest neighbors are identified. In one embodiment, the subset of possible nearest neighbors is identified by comparing the TSD to the MSDs. For example, the subset of possible nearest neighbors may be identified as those objects having an MSD less than the TSD/(number of transformation variables). In the example of FIG. 4, there are three transformation variables, therefore the subset of possible nearest neighbors would be identified as those objects having an MSD less than TSD/3. Dividing by the number of transformation variables has the effect of normalizing the TSD value.

With the subset of possible nearest neighbors identified, the TSD between object i and each member of the subset of possible nearest neighbors is calculated resulting in a subset of TSD values (process block 640). In a process block 645, the object associated with the smallest TSD, corresponding to either the initially identified possible nearest neighbor (from process block 625) or one of the objects within the identified subset of possible nearest neighbors (from process block 635), is selected as the nearest neighbor to object i. Columns 505 and 510 of nearest neighbor matrix 500 are updated to reflect the nearest neighbor and proximity value for object i.

If nearest neighbor matrix 500 has not yet been fully populated (decision block 650), then process 600 selects the next current object i=i+1 (process block 655) and loops back to process block 615 and repeats. Loop 611 is repeated until nearest neighbor matrix 500 is complete (decision block 650). Once nearest neighbor matrix 500 is complete, process 600 is finished at a process block 660.

Figure 7:
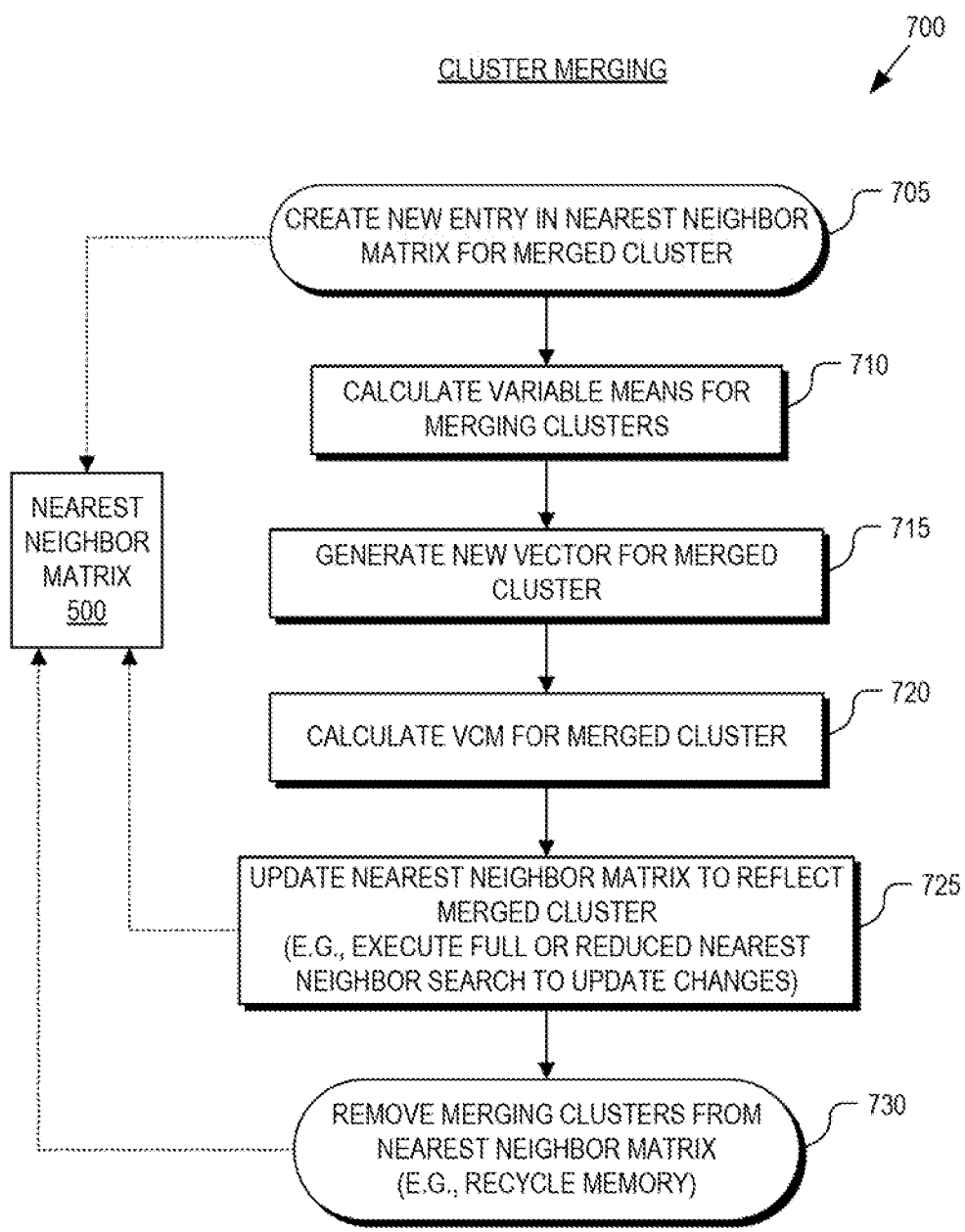
FIG. 7 is a flow chart illustrating a process for merging two clusters, in accordance with an embodiment of the invention.

FIG. 7 is a flow chart illustrating a process 700 for merging two clusters, in accordance with an embodiment of the invention. Process 700 represents greater detail for performing one embodiment of process blocks 230 and 235 in FIG. 2, and thus, in one embodiment may be viewed as an extension of process 200. The order in which some or all of the process blocks appear in process 700 should not be deemed limiting. Rather, one of ordinary skill in the art having the benefit of the present disclosure will understand that some of the process blocks may be executed in a variety of orders not illustrated.

In a process block 705, a new entry is created within nearest neighbor matrix 500 into which the merged cluster will be populated. In one embodiment, creating a new entry includes creating a new row within nearest neighbor matrix 500. In one embodiment, the new entry is created using recycled memory or a recycled entry from one of the merging clusters.

In a process block 710, variable means are calculated for the merging clusters. Calculating variable means is akin to calculating the centroid of the two merging clusters based on their transformation variables and the number of samples comprising each of the two merging clusters. For example, if the transformation variables of SAMPLE(B) and SAMPLE (C) are being merged, then the variable means may be calculated as follows: (TVB1+TVC1)/2; (TVB2+TVC2)/2; (TVB3+TVC3)/2. Of course, alternative centroid calculations may be used.

In a process block 715, a new vector based on the variable means is generated for the merged cluster. For example, CLUSTER(C1)=[(TVB1+TVC1)/2, (TVB2+TVC2)/2, (TVB3+TVC3)/2].

In a process block 720, a VCM is calculated for the newly created merged cluster. In a process block 725, nearest neighbor matrix 500 is updated to reflect the addition of the new merged cluster. This updating process involves calculating the nearest neighbor for the newly merged cluster, and determining the new nearest neighbor for each of the unmerged clusters that had one of the merged clusters as a nearest neighbor. In one embodiment, updating nearest neighbor matrix 500 may include performing a reduced nearest neighbor search by re-executing portions of process 600. In another embodiment, updating nearest neighbor matrix 500 may include updating the relevant portions of nearest neighbor matrix 500 by calculating TSDs for a limited number of samples within nearest neighbor matrix 500 that are affected by the merger, instead of executing the reduced nearest neighbor searched as described in process 600.

Finally, in a process block 730 the entries within nearest neighbor matrix 500 associated with the merging clusters or merging objects are removed from nearest neighbor matrix 500. In an embodiment where memory or entries are recycled, only one of the merging entries may need to be removed (or otherwise flagged invalid), since the other entry may have been reused. Of course, one of ordinary skill in the relevant art having the benefit of the instant disclosure will appreciate that there are a variety of bookkeeping measures and memory recycling techniques that may be applied within the spirit of embodiments of the present invention.

Figure 8:
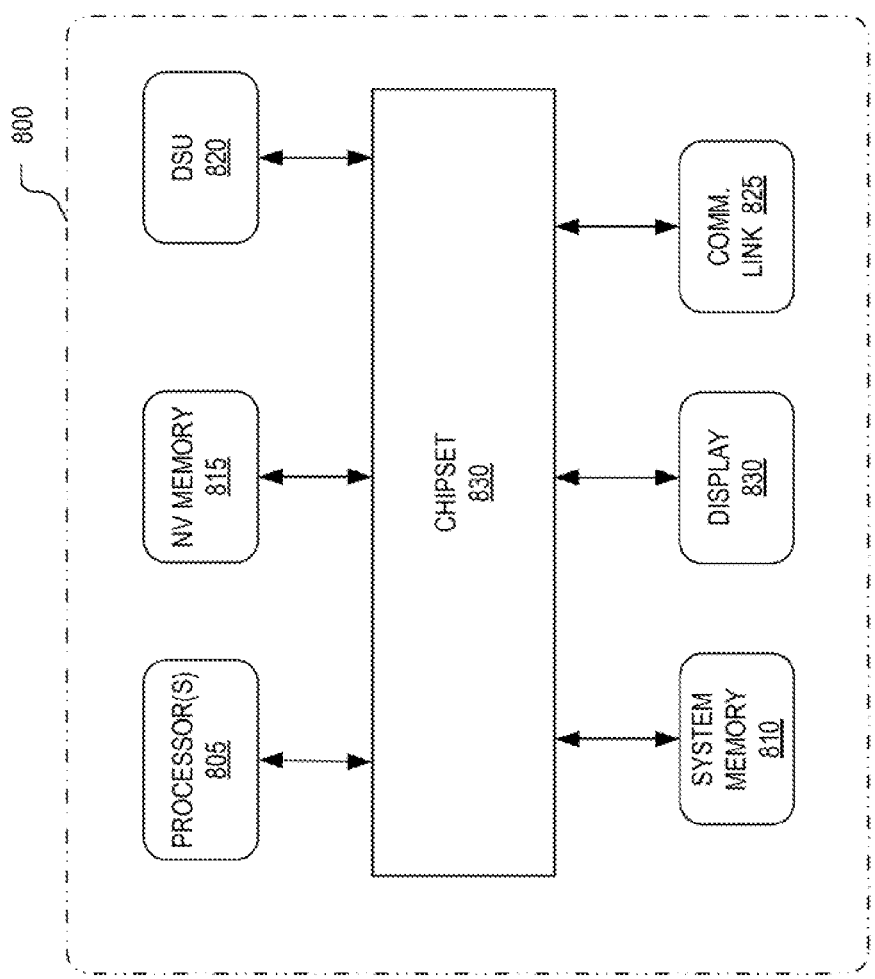
FIG. 8 is a functional block diagram illustrating a demonstrative processing system for implementing embodiments of the invention.

FIG. 8 is a block diagram illustrating a demonstrative processing system 800 for executing any or all of processes 200, 600, or 700. The illustrated embodiment of processing system 800 includes one or more processors (or central processing units) 805, system memory 810, nonvolatile ("NV") memory 815, a DSU 820, a communication link 825, and a chipset 830. The illustrated processing system 800 may represent any computing system including a desktop computer, a notebook computer, a workstation, a handheld computer, a server, a blade server, or the like.

The elements of processing system 800 are interconnected as follows. Processor(s) 805 is communicatively coupled to system memory 810, NV memory 815, DSU 820, and communication link 825, via chipset 830 to send and to receive instructions or data thereto/therefrom. In one embodiment, NV memory 815 is a flash memory device. In other embodiments, NV memory 815 includes any one of read only memory ("ROM"), programmable ROM, erasable programmable ROM, electrically erasable programmable ROM, or the like. In one embodiment, system memory 810 includes random access memory ("RAM"), such as dynamic RAM ("DRAM"), synchronous DRAM, ("SDRAM"), double data rate SDRAM ("DDR SDRAM"), static RAM ("SRAM"), and the like. DSU 820 represents any storage device for software data, applications, and/or operating systems, but will most typically be a nonvolatile storage device. DSU 820 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 820 is illustrated as internal to processing system 800, DSU 820 may be externally coupled to processing system 800. Communication link 825 may couple processing system 800 to a network such that processing system 800 may communicate over the network with one or more other computers. Communication link 825 may include a modem, an Ethernet card, a Gigabit Ethernet card, Universal Serial Bus ("USB") port, a wireless network interface card, a fiber optic interface, or the like.

It should be appreciated that various other elements of processing system 800 have been excluded from FIG. 8 and this discussion for the purposes of clarity. For example, processing system 800 may further include a graphics card for rendering images to a screen (e.g., dendrogram), additional DSUs, other persistent data storage devices (e.g., tape drive), and the like. Chipset 830 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 830. Correspondingly, processing system 800 may operate without one or more of the elements illustrated. For example, processing system 800 need not include DSU 820.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more processors, etc.). For example, a computer-readable storage medium includes recordable/non-recordable media (e g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

APPENDIX A

```
function [cluster_tree] = centroid_cluster(dat)
% Input -
% dat : data matrix to be clustered (variables by samples)
%
% Output -
% cluster_tree : hierarchical clustering tree (samples-1 by 3). Columns 1
%         and 2 contain cluster indices linked in pairs to form a
%         binary tree. The 3rd column contains the euclidean
%         centroid distance between the cluster pairs. This cluster
%         tree matches the output generated by the Mathworks
%         linkage.m. Use dendrogram.m to visualize the cluster tree.
[n,m] = size(dat);
% Initialize vector containing the number of samples in each cluster
clust_num_samps = ones(1,m);
% Initialize vector containing the index assigned to each of the current
% clusters
clust_index = [1:m];
% Initialize vector containing nearest neighbor of each cluster
clust_nn = zeros(1,m);
% Initialize vector containing nearest neighbor distance for each cluster
clust_nn_dist = zeros(1,m);
cluster_tree = zeros(m-1,3);
```

APPENDIX A-continued

```
dat_mean = mean(dat,1);
% Step 0: Calculate nearest neighbor and nearest neighbor distance for each sample
for f = 1:m
    g_temp = [1:f-1 f+1:m];
    % Note: 1 calculate mean values for the vectors to reduce the number of required
    % full vector distance calculations and save computational time.
    diff_sq = (dat_mean(g_temp) - dat_mean(f)).^2;
    [diff_sq_min, ind_min] = min(diff_sq);
    dist_min_f = sum((dat(:,f) - dat(:,g_temp(ind_min))).^2);
    ind_check = find(diff_sq < dist_min_f/n);
    dist_temp_vec = sum((repmat(dat(:,f),1,length(ind_check)) - ...
        dat(:,g_temp(ind_check))).^2);
    [val_min_dist_temp_vec, ind_min_dist_temp_vec] = min(dist_temp_vec);
    if val_min_dist_temp_vec < dist_min_f
        clust_nn_dist(f) - val_min_dist_temp_vec;
        clust_nn(f) = g_temp(ind_check(ind_min_dist_temp_vec));
    else
        clust_nn_dist(f) = dist_min_f;
        clust_nn(f) = g_temp(ind_min);
    end
end
for h = m:-1:2
    % Step 1: Use clust_nn_dist, clust_nn, and clust_index to identify the closest
    % pair of clusters
    %
    [min_dist, ind_min_dist] = min(clust_nn_dist);
    % Assemble and sort current assigned cluster indices for closest pair of clusters
    assign_clust_ind_sort = sort([clust_index(ind_min_dist) clust_nn(ind_min_dist)]);
    %
    % Assemble and sort indices for closet pair of clusters
    clust_pair_ind = find(clust_index == clust_nn(ind_min_dist));
    clust_ind_sort = sort([ind_min_dist clust_pair_ind(1)]);
    %
    % Update cluster tree with assigned cluster indices for closest pair of
    % clusters and minimum cluster pair distance
    cluster_tree(m-h+1,:) = [assign_clust_ind_sort min_dist];
    if h > 2
        % Step 2: Replace cluster pair by agglomerated cluster
        %
        % Update dat matrix containing cluster mean vectors
        dat(:,1:h-1) = [dat(:,1:clust_ind_sort(1)-1) ...
            dat(:,clust_ind_sort(1)+1:clust_ind_sort(2)-1) ...
            dat(:,clust_ind_sort(2)+1:h) ...
            (dat(:,clust_ind_sort(1))*clust_num_samps(clust_ind_sort(1)) ...
            + dat(:,clust_ind_sort(2))*clust_num_samps(clust_ind_sort(2)))/...
            (clust_num_samps(clust_ind_sort(1)) + clust_num_samps(clust_ind_sort(2)))];
        %
        % Update vector containing the number of samples in each cluster
        clust_num_samps(1:h-1) = [clust_num_samps(1:clust_ind_sort(1)-1) ...
            clust_num_samps(clust_ind_sort(1)+1:clust_ind_sort(2)-1) ...
            clust_num_samps(clust_ind_sort(2)+1:h) ...
            (clust_num_samps(clust_ind_sort(1)) + clust_num_samps(clust_ind_sort(2)))];
        %
        % Update vector containing the index assigned to each of the current clusters
        % Note: the index for the newly formed cluster is equal to the number
        % of initial nodes (samples) plus the current iteration number.
        clust_index(1:h-1) = [clust_index(1:clust_ind_sort(1)-1) ...
            clust_index(clust_ind_sort(1)+1:clust_ind_sort(2)-1) ...
            clust_index(clust_ind_sort(2)+1:h) m+m-h+1];
        % Step 3: Update vectors identifying nearest neighbor for each cluster
        % and nearest neighbor distance for each cluster
        %
        % Initialize nearest neighbor distance values to those from previous
        % iteration and nearest neighbor distance for newly formed cluster to
        % zero
        clust_nn_dist = [clust_nn_dist(1:clust_ind_sort(1)-1) ...
            clust_nn_dist(clust_ind_sort(1)+1:clust_ind_sort(2)-1) ...
            clust_nn_dist(clust_ind_sort(2)+1:h)0];
        %
        % Initialize nearest neighbor vector to those from previous iteration
        % and nearest neighbor for newly formed cluster to zero
        clust_nn = [clust_nn(1:clust_ind_sort(1)-1) ...
            clust_nn(clust_ind_sort(1)+1:clust_ind_sort(2)-1) ...
            clust_nn(clust_ind_sort(2)+1:h) 0];
        %
        % Calculate nearest neighbor and nearest neighbor distance for newly formed
        % cluster
        dist_new_clust_temp = sum((repmat(dat(:,h-1),1,h-2) - dat(:,1:h-2)).^2);
        [dist_min_val, dist_min_ind] = min(dist_new_clust_temp);
        clust_nn_dist(h-1) = dist_min_val;
```

APPENDIX A-continued

```
        clust_nn(h-1) = clust_index(dist_min_ind);
        %
        % Update if newly formed cluster is nearest neighbor for any of the
        % previously existing clusters
        ind_nn = find(dist_new_clust_temp < clust_nn_dist(1:h-2));
        if ~isempty(ind_nn)
            clust_nn_dist(ind_nn) = dist_new_clust_temp(ind_nn);
            clust_nn(ind_nn) = m+m-h+1;
        end
        %
        % Update if nearest neighbor for any of the previously existing
        % clusters had one of the clusters from the closest pair of clusters as
        % a nearest neighbor
        ind_search_nn = find((clust_nn(1:h-2) == assign_clust_ind_sort(1)) | ...
            (clust_nn(1:h-2) = assign_clust_ind_sort(2)));
        for i = 1:length(ind_search_nn)
            j_temp = [1:ind_search_nn(i)-1 ind_search_nn(i)+1:h-1];
            dist_temp_vec = sum((repmat(dat(:,ind_search_nn(i)),1,h-2) - ...
                dat(:,j_temp)).^2);
            [dist_min_val, dist_min_ind] = min(dist_temp_vec);
            clust_nn_dist(ind_search_nn(i)) = dist_min_val;
            clust_nn(ind_search_nn(i)) - clust_index(j_temp(dist_min_ind));
        end
    end
end
% Take the square root to convert from squared distance
cluster_tree(:,3) = sqrt(cluster_tree(:,3));
```

What is claimed is:

1. A computer implemented method for hierarchical clustering of samples in a dataset, the method comprising:

compressing the dataset to reduce a number of variables within each of the samples of the dataset;

generating a nearest neighbor matrix identifying only nearest neighbor pairs between the samples based on differences between the variables of the samples and a corresponding proximity value associated with each of the nearest neighbor pairs;

iteratively arranging the samples into a hierarchy that groups the samples based on the nearest neighbor matrix; and rendering the hierarchy to a display to graphically illustrate similarities or differences between the samples, wherein the nearest neighbor matrix is a separate data structure from the hierarchy that graphically illustrates similarities or differences between the samples, wherein the nearest neighbor matrix is iteratively updated to only identify updated nearest neighbor pairs with each iteration, and wherein each iteration of the separate data structure is used to generate a corresponding level of the hierarchy, wherein generating the nearest neighbor matrix comprises:

calculating a vector component mean (VCM) for each of the samples; and for a given sample:

calculating VCM differences between the VCM of the given sample and the VCM of all other samples;

identifying a possible nearest neighbor to the given sample based at least indirectly on the VCM differences;

calculating a distance using a proximity measure between the possible nearest neighbor and the given sample; and identifying a subset of additional possible nearest neighbors, base at least indirectly on the VCM differences and the distance calculated for just the possible nearest neighbor using the proximity measure, wherein a given nearest neighbor for the given sample is selected from amongst the possible nearest neighbor and the additional possible nearest neighbors, wherein the subset is less than all of the other samples.

2. The computer implemented method of claim 1, wherein iteratively arranging the samples into the hierarchy comprises iteratively:

identifying one of the nearest neighbor pairs having a closest proximity;

merging the one of the nearest neighbor pairs into a merged cluster; and updating the nearest neighbor matrix to reflect the merged cluster.

3. The computer implemented method of claim 2, wherein each iteration of arranging the samples into the hierarchy, further includes:

storing a representation of the merged cluster into a cluster tree at a current level of the cluster tree dependent upon a number of the iterations.

4. The computer implemented method of claim 2, wherein merging the one of the nearest neighbor pairs into the merged cluster comprises:

calculating variable means based on the variables of merging clusters;

generating a new variable vector for the merged cluster based on the variable means; and calculating a vector component mean for the merged cluster based on the variable means of the merged cluster.

5. The computer implemented method of claim 1, wherein compressing the dataset to reduce the number of variables within each of the samples of the dataset comprises:

performing principal component analysis on the dataset to reduce the number of variables within each of the samples of the dataset.

6. The computer implemented method of claim 1, wherein performing the principal component analysis on the dataset to reduce the number of variables within each of the samples of the dataset comprises:

generating transformation variables that represent linear combinations of the variables, wherein a first number of the transformation variables for a given sample is less than a second number of the variables for the given sample prior to the principal component analysis.

7. The computer implemented method of claim 1, wherein the proximity measure comprises a Euclidean distance measurement.

8. The computer implemented method of claim 1, wherein identifying the possible nearest neighbor to the given sample based at least indirectly on the VCM differences comprises:
squaring the VCM differences to generate mean squared differences (MSDs); and
identifying a minimum MSD from among the MSDs.

9. The computer implemented method of claim 1, wherein identifying the subset of additional possible nearest neighbors, based at least indirectly on the VCM differences and the distance calculated using the proximity measure, from which the given nearest neighbor for the given sample is selected, comprises:
calculating distances using the proximity measure between the given sample and all of the possible nearest neighbors identified in the subset; and
selecting one of the possible nearest neighbors, within the subset having a smallest calculated distance using the proximity measure to the given sample, to be the given nearest neighbor for the given sample.

10. The computer implemented method of claim 1, wherein rendering the hierarchy to the display to graphically illustrate the similarities or the differences between the samples comprises rendering an agglomerative dendrogram hierarchically arranging the samples.

11. The computer implemented method of claim 1, wherein the dataset comprises greater than 10,000 of the samples and the number of the variables prior to compressing the dataset to reduce the number of variables is greater than 100 of the variables.

12. A non-transitory computer-readable storage medium that provides instructions that, when executed by a machine, will cause the machine to perform operations comprising:
compressing samples in a dataset to reduce a number of variables within each of the samples of the dataset;
generating a nearest neighbor matrix identifying only nearest neighbor pairs between samples of a dataset based on differences between the variables of the samples and a corresponding proximity value associated with each of the nearest neighbor pairs;
iteratively arranging the samples into a hierarchy that groups the samples based on the nearest neighbor matrix; and
rendering the hierarchy to a display to graphically illustrate similarities or differences between the samples,
wherein the nearest neighbor matrix is a separate data structure from the hierarchy that graphically illustrate similarities or differences between the samples, wherein the nearest neighbor matrix is iteratively updated to only identify updated nearest neighbor pairs with each iteration, and wherein each iteration of the separate data structure is used to generate a corresponding level of hierarchy,
wherein generating the nearest neighbor matrix comprises:
calculating a vector component mean (VCM) for each of the samples; and
for a given sample:
calculating VCM differences between the VCM of the given sample and the VCM of all other samples;
identifying a possible nearest neighbor to the given sample based at least indirectly on the VCM differences;
calculating a distance using a proximity measure between the possible nearest neighbor and the given sample; and
identifying a subset of additional possible nearest neighbors, based at least indirectly on the VCM differences and the distance calculated for just the possible nearest neighbor using the proximity measure, wherein a given nearest neighbor for the given sample is selected from amongst the possible nearest neighbor and the additional possible nearest neighbors, wherein the subset is less than all of the other samples.

13. The non-transitory computer-readable storage medium of claim 12, wherein iteratively arranging the samples into the hierarchy comprises iteratively:
identifying one of the nearest neighbor pairs having a closest proximity;
merging the one of the nearest neighbor pairs into a merged cluster; and
updating the nearest neighbor matrix to reflect the merged cluster.

14. The non-transitory computer-readable storage medium of claim 13, wherein merging the one of the nearest neighbor pairs into the merged cluster comprises:
calculating variable means based on the variables of merging clusters;
generating a new variable vector for the merged cluster based on the variable means; and
calculating a vector component mean for the merged cluster based on the variable means of the merged cluster.

15. The non-transitory computer-readable storage medium of claim 12, wherein identifying the possible nearest neighbor to the given sample based at least indirectly on the VCM differences comprises:
squaring the VCM differences to generate mean squared differences (MSDs); and
identifying a minimum MSD from among the MSDs.

16. The non-transitory computer-readable storage medium of claim 12, wherein identifying the subset of additional possible nearest neighbors, based at least indirectly on the VCM differences and the distance calculated using the proximity measure, from which the given nearest neighbor for the given sample is selected comprises:
calculating distances using the proximity measure between the given sample and all of the possible nearest neighbors identified in the subset; and
selecting one of the possible nearest neighbors, within the subset having a smallest calculated distance using the proximity measure to the given sample, to be the given nearest neighbor for the given sample.

17. The non-transitory computer-readable storage medium of claim 11, wherein the dataset comprises greater than 10,000 of the samples and the number of the variables prior to compressing the dataset to reduce the number of variables is greater than 100 of the variables.

18. A non-transitory computer-readable storage medium that provides instructions that, when executed by a machine, will cause the machine to perform operations comprising:
compressing an original dataset to generate a reduced dataset, wherein the reduced dataset includes samples each having a reduced number of variables than the samples of the original dataset;
generating a nearest neighbor matrix based on the reduced dataset identifying only nearest neighbor pairs between the samples and a corresponding proximity value associated with each of the nearest neighbor pairs;

iteratively arranging the samples into a hierarchy that clusters the samples based on measurements of similarity or dissimilarity between the samples; and rendering the hierarchy to display to graphically illustrate similarities or differences between the samples, wherein the nearest neighbor matrix is a separate data structure from the hierarchy that graphically illustrates similarities or differences between the samples, wherein the nearest neighbor matrix is iteratively updated to only identify updated nearest neighbor pairs with each iteration, and wherein each iteration of the separate data structure is used to generate a corresponding level of the hierarchy, wherein generating the nearest neighbor matrix comprises:
 calculating a vector component mean (VCM) for each of the samples; and
 for a given sample:
  calculating VCM differences between the VCM of the given sample and the VCM of all other samples;
  identifying a possible nearest neighbor to the given sample based at least indirectly on the VCM differences;
  calculating a distance using a proximity measure between the possible nearest neighbor and the given samples; and
  identifying a subset of additional possible nearest neighbors, based at least indirectly on the VCM differences and the distance calculated for the possible nearest neighbor using the proximity measure, wherein a given nearest neighbor for the given sample is selected from amongst the possible nearest neighbor and the additional possible nearest neighbors, wherein the subset is less than all of the other samples.

19. The non-transitory computer-readable storage medium of claim 18, wherein iteratively arranging the samples into the hierarchy comprises iteratively:
 identifying one of the nearest neighbor pairs having a closest proximity;
 merging the one of the nearest neighbor pairs into a merged cluster; and
 updating the nearest neighbor matrix to reflect the merged cluster.

20. The non-transitory computer-readable storage medium of claim 19, wherein merging the one of the nearest neighbor pairs into the merged cluster comprises:
 calculating variable means based on the variables of merging clusters;
 generating a new variable vector for the merged cluster based on the variable means; and
 calculating a vector component mean for the merged cluster based on the variable means of the merged cluster.

21. The non-transitory computer-readable storage medium of claim 18, wherein compressing the original dataset to generate the reduced dataset comprises:
 performing principal component analysis on the original dataset; and
 generating transformation variables that represent linear combinations of the variables, wherein a first number of the transformation variables for a given sample is less than a second number of the variables for the given sample in the original dataset.

22. The non-transitory computer-readable storage medium of claim 18, wherein identifying the subset of additional possible nearest neighbors, based at least indirectly on the VCM differences and the distance calculated using the proximity measure, from which the given nearest neighbor for the given sample is selected, comprises:
 calculating distances using the proximity measure between the given sample and all of the possible nearest neighbors identified in the subset; and
 selecting one of the possible nearest neighbors, within the subset having a smallest calculated distance using the proximity measure to the given sample, to be the given nearest neighbor for the given sample.

* * * * *